Jan. 19, 1943.   G. STEELE ET AL   2,308,553
ARTIFICIAL TOOTH
Filed Oct. 28, 1940
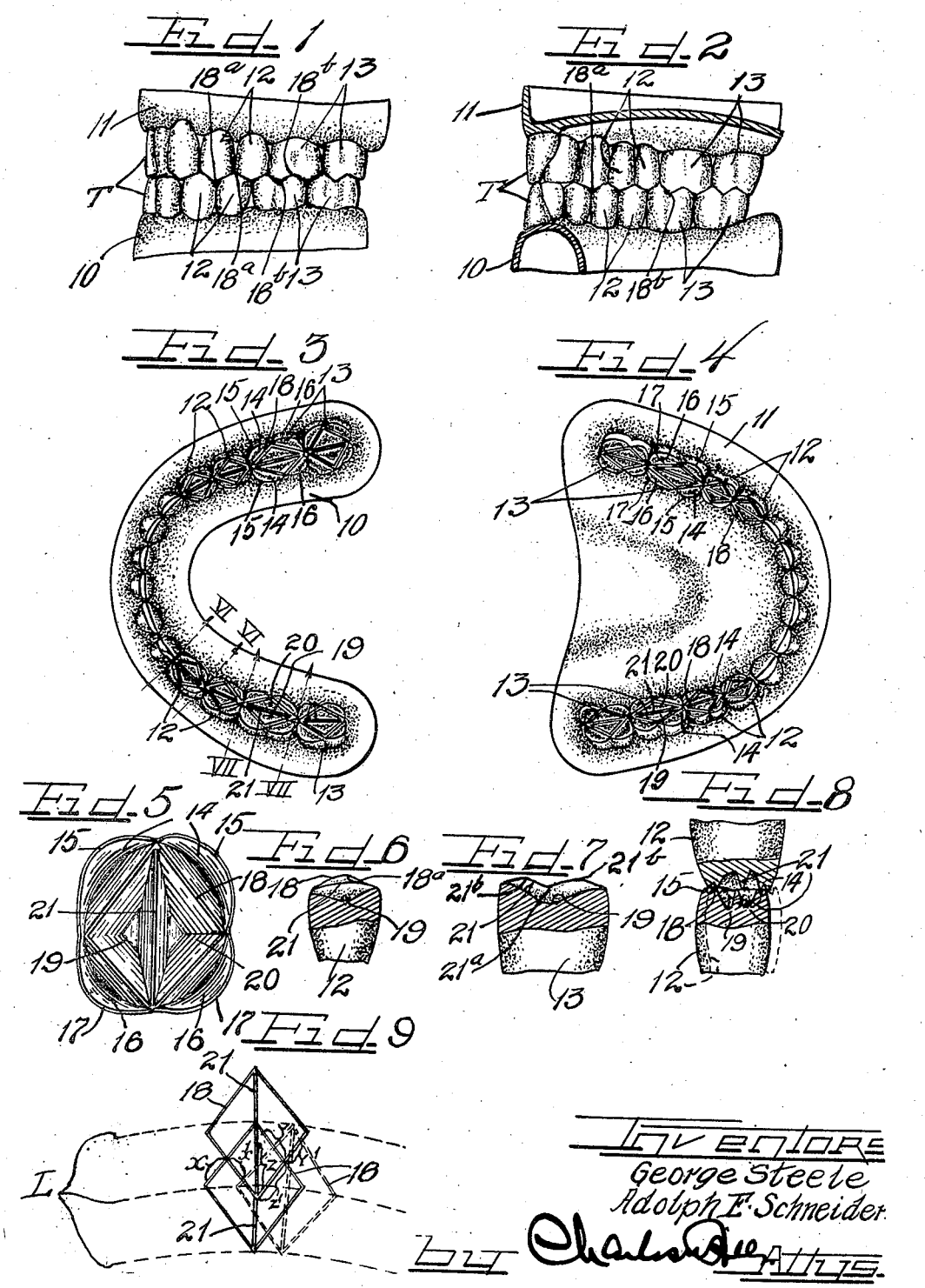

UNITED STATES PATENT OFFICE 2,308,553

ARTIFICIAL TOOTH

George Steele and Adolph E. Schneider, Chicago, Ill., said Steele assignor to said Schneider Application October 28, 1940, Serial No. 363,090

13 Claims. (Cl. 32—8)

This invention relates to artificial teeth having improved occlusal surfaces to facilitate the mastication of food under decreased masticating pressures.

More specifically the invention relates to dentures having specially developed occlusal surfaces on the posterior teeth thereof to facilitate mastication and eliminate prognathism.

Natural teeth are set in the bone structure of a human mouth in such a manner as to allow movement of the teeth relative to the jaw in every direction. This movement is up to one-sixtieth of an inch and cushions the articular blow in mastication. In artificial dentures, on the other hand, the teeth are immovably fixed in a plate and the plate must rest on soft gum tissue. Masticating pressures of the magnitude frequently developed in chewing with natural teeth cannot be attained with artificial dentures without great pain to the wearer, since the plate rests on this soft gum tissue. This results in masticating deficiencies as they relate to crushing power in food mastication and causes intestinal food fermentations.

The present invention now provides an improved occlusal or masticating surface for the posterior teeth in artificial dentures for facilitating the mastication of food at low pressures or with impacts which will not cause pain to the wearer, and yet provide ample incising, shearing, and macerating of the food even under the low biting power obtainable with dentures. It is highly desirable, in artificial dentures, to closely imitate the buccal and lingual contours of natural teeth in order to avoid an obvious false appearance. In the present invention the artificial teeth exactly follow the buccal and lingual design of natural teeth.

In order to prevent prognathism with artificial dentures it is highly desirable to interlock the bite between co-operating upper and lower teeth along the facial-pharyngeal axes thereof. At the same time, however, allowance must be made for side movement along the approximate 20° arcuate plane of chewing movement of the lower jaw. The present invention provides dentures with posterior teeth which lock in the same manner as natural teeth during biting contact thereby holding the plates in position. This, of course, cannot be done with flat occlusal surfaces.

The occlusal surfaces provided in the present invention produce a large table or biting area for holding the food. The surfaces are so designed as to tear shreddy foods to pieces at low masticating pressures. Heretofore artificial dentures merely compressed or mashed the food without cutting or severing the fibers, thereby inducing prognathic tendencies when fibrous foods were chewed.

A feature of the present invention includes providing the occlusal surfaces on both upper and lower posterior teeth with a plurality of isolated cavities defining spaced ridges or shearing lines in nested relation and merging together on the facial-pharyngeal axis. In a preferred form of the invention a peripheral ridge is formed around each posterior tooth to circumscribe a diamond-shaped ridge having the points thereof merging into the peripheral ridge. The diamond ridge is bisected by a longitudinal ridge on the facial-pharyngeal axis. The resulting construction provides a lobar pattern following the unfoldment design of a rose bud wherein the petals unfold away from the pistil. In the occlusal surface provided by the present invention the lobar pattern has leaves or surfaces folding away from a central ridge and providing the diamond-shaped and peripheral ridges with their edges.

It is, then, an object of this invention to provide dentures with posterior teeth having natural appearing side wall contours and occlusal surfaces with a lobar pattern following the unfoldment design of a bud and providing accentuated shearing ridges.

A further object of the invention is to provide an improved occlusal surface on artificial posterior teeth for creating shearing action between opposing and cooperating pairs of the teeth.

A further object of this invention is to provide occlusal surfaces on artificial posterior teeth having a plurality of cavities defining nested shearing ridges.

A still further object of the invention is to provide dentures with upper and lower posterior teeth having occlusal surfaces which lock the dentures against prognathism while at the same time permitting free sidewise chewing movement of the dentures.

Another object of this invention is to provide posterior teeth with large biting tables having diverging shearing ridges along the facial-pharyngeal axis.

A specific object of the invention is to provide a posterior tooth having an occlusal surface with a peripheral ridge, a diamond-shaped ridge within the peripheral ridge, and a longitudinal ridge bisecting the diamond ridge.

Other and further objects of the invention will be apparent to those skilled in the art from the following detailed description of the annexed sheet of drawings which discloses a preferred embodiment of the invention.

On the drawing:

Figure 1 is a side elevational view of a pair of dentures according to this invention.

Figure 2 is a vertical longitudinal cross-sectional view taken through the dentures of Figure 1 showing lingual aspect.

Figure 3 is a plan view of the bottom denture shown in Figure 1.

Figure 4 is a plan view of the top denture shown in Figure 1.

Figure 5 is an enlarged plan view illustrating the details of the occlusal surface on a posterior tooth according to this invention.

Figure 6 is a fragmentary side elevational view of a bicuspid tooth according to this invention with a part shown in cross section along the line VI—VI of Figure 3.

Figure 7 is a fragmentary side elevational view of a molar tooth according to this invention with a part shown in cross section along the line VII—VII of Figure 3.

Figure 8 is a fragmentary front elevational view of cooperating upper and lower bicuspid teeth, with parts broken away and shown in vertical cross section, illustrating the cooperating relationship between the ridges on the occlusal surfaces according to this invention, and showing in dotted lines the extent of side movement of the lower tooth during mastication.

Figure 9 is a geometric diagram illustrating the shearing actions produced by mating occlusal surfaces of this invention.

As shown on the drawing:

In Figures 1 to 4 inclusive the reference numerals 10 and 11 respectively designate lower and upper dentures or plates made of the usual denture material and carrying teeth T projecting therefrom.

It will be noted from Figures 1 and 2 that the side wall contours of the teeth T, and especially the lingual and buccal walls, are shaped identically with the shapes of nautral teeth. The teeth T therefore have a natural appearance.

As shown in Figures 3 and 4 the bicuspid teeth 12 and the molar teeth 13 of each plate or denture 10 and 11 have specially designed occlusal surfaces. The teeth 12 and 13 represent the posterior teeth of each plate and their primary function is to grind, shear or otherwise masticate food. The anterior teeth, on the other hand, have cusps shaped identically with natural teeth.

In accordance with this invention, the posterior teeth 12 and 13 have cavities or depressions 14 diverging from the mesial end to the linqual and buccal surfaces of each tooth at the midportion of the tooth to provide peripheral ridges 15 following the side wall contour of the teeth. Additional cavities 16 converge from the lingual and buccal surfaces at the mid-portion of each posterior tooth to the distal end of the tooth to provide peripheral ridges 17. The cavities 14 and 16 are thus externally bounded by the peripheral ridges 15 and 17.

An inner diamond-shaped ridge 18 is nested within the ridges 15 and 17. The four points of the diamond-shaped ridge 18 merge into the peripheral ridges 15 and 17. Thus the front and rear points are at the convergent ends of the cavities 14 and 16 adjacent the mesial and distal ends of the tooth while the inner and outer side points are at the divergent ends of these cavities adjacent the lingual and buccal sides of the tooth.

Since the diamond-shaped ridge merges into the peripheral ridges at four points, each cavity 14 and 16 is isolated.

Deeper cavities 19 and 20 are formed within the diamond-shaped ridge 18 and are separated by a longitudinal bisecting ridge 21 extending along the facial-pharyngeal axis of the tooth.

Each posterior tooth 12 or 13 thus has six isolated cavities in the occlusal surfaces thereof bounded by ridges which provide accentuated shearing surfaces. The ridges 15 and the adjacent portions of the diamond-shaped ridge 18 diverge from the mesial end of the tooth outwardly to the lingual and buccal sides of the tooth at a mid-point of the tooth. The ridges 17 and the adjacent portions of the diamond-shaped ridge 18 then converge from this mid-point to the distal end of the tooth. The bisecting ridge 21 extends from the mesial to the distal end of the tooth.

The accentuated shearing ridges bounding the six cavities are of varying heights to follow the normal lobar pattern of a natural cusp.

The occlusal surfaces of the bicuspid teeth differ from the occlusal surfaces of the molar teeth 13 as best shown in Figures 6 and 7.

The bicuspid tooth 12 in Figure 6 has the bisecting or central ridge 21 extending along a continuous convex line from the mesial to the distal end of the tooth. The high point of the convex line is at the high point of the cusp. The diamond ridge 18 and the peripheral ridges 15 and 17 curve upwardly from the distal and mesial ends of the tooth to form rounded high points 18a at the mid-portion of the tooth on the buccal and lingual sides thereof and thus follow the contour of the ridge 21.

The molar tooth 13, however, as shown in Figure 7, has the central ridge 21 formed with a wave-like or sinuous contour providing a central depression 21a and high points 21b. The depression 21a in the ridge is in line with the merging points of the diamond-shaped ridge 18 with the peripheral ridges 15 and 17 at the lingual and buccal sides of the tooth. The ridges 15, 17 and 18 hollow the contour of the central ridge and thus provide depressions 18b (Figures 1 and 2) at the mid-portion of each molar at the buccal and lingual sides thereof.

As shown in Figures 1 and 2, the mating molar teeth 13 can, by virtue of the mid-depressions in the ridges formed on their occlusal surfaces, lock in the same manner as natural teeth and thereby eliminate any prognathism of the lower plate 10. The depression 21a in the central ridge 21 is aligned with the central depressions 18b in the ridges 15, 17 and 18 to permit full seating engagement between the teeth.

The convex contour of the ridges in the bicuspid teeth 12 permit the teeth to nest as also shown in Figures 1 and 2.

As shown in Figure 8, the lower posterior teeth 12 has a natural side movement during mastication from the position shown in solid lines to the position shown in dotted lines. This is due to the fact that the lower normal jaw travels during chewing in an approximately 20° arcuate segment of a globe with an eight inch circumference. The ridges formed on the occlusal surfaces of the teeth according to this invention permit this sidewise movement but, at the same time, lock the dentures from moving along the facial-pharyngeal axis.

During the sidewise movement of the lower bicuspid 12 the ridges on the occlusal surfaces thereof will slide past the ridges on the occlusal surface of the cooperating upper tooth 12 as shown in dotted lines thereby effecting a shearing action on any food between the teeth. Since the ridges are along diverging lines, this shearing action will be prolonged and accentuated. Furthermore, since the ridges of mating teeth only engage in knife edge relation, or point to point contact, great penetrating and shearing effect is obtained. As a result, shreddy food will be cut or sheared without necessity for high masticating pressures or impacts.

This shearing action is better illustrated in Figure 9 wherein the diamond-shaped ridge 18 of a lower posterior tooth is illustrated as moving along the arcuate lines L from its aligned position with the upper mating ridge 18 as shown in solid lines to the displaced position shown in dotted lines. The lines L represent the sidewise arcuate movement of the lower jaw in chewing. It will thus be seen that the portion X of the lower ridge 18 slides along the portion X' of the upper ridge 18 as the lower ridge moves between the solid line and the dotted line positions along the arcuate paths L. At the same time the portion Y of the lower ridge 18 slides along the portion Y' of the upper ridge 18. In addition, the lower ridge 21 has a portion Z of the length thereof moved across the portion Z' of the upper ridge 18. This produces prolonged multi-shearing action that will readily cut even very fibrous foods at low masticating pressures.

It should also be noted that the sides of the ridges slope outwardly toward the lingual and buccal sides of the tooth. This serves to clean the six cavities in each tooth, since food entering the cavities will be squeezed out toward the lingual and buccal sides during mastication.

From the above description it should be understood that this invention now provides posterior teeth with occlusal surfaces presenting a large table or biting area. The occlusal surface of each posterior tooth has a plurality of cavities therein defining divergent peripheral ridges, a diamond-shaped ridge, and a longitudinal ridge bisecting the diamond-shaped ridge. These ridges follow the lobar pattern of a natural tooth and the cavities are so arranged that the occlusal surface may be considered to follow the unfoldment design of a bud. Although the ridges terminate in knife-like edges, these edges have varying contours which conform to the lobar pattern in natural teeth. These contours or wave-like surfaces prevent prognathism but permit normal lateral movement or attritional action.

The point contact between the ridges encountered when cooperating pairs of teeth according to this invention are brought together in a biting or chewing action gives great cutting efficiency with the least possible amount of pressure.

It should be especially understood that the occlusal surfaces of the posterior teeth according to this invention do not lie in single planes but, on the contrary, follow the lobar patterns of natural teeth.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A posterior tooth having a lobar pattern on the occlusal surface thereof following the nested layer unfoldment design of a bud and providing accentuated knife-edged shearing lines free from flat table surfaces at the edge of each unfolding layer.

2. A posterior tooth having its occlusal surface formed with a plurality of tapered cavities bounded by shearing ridges with converging side walls terminating in line contact, and said ridges merging together at the facial-pharyngeal axis of the tooth.

3. A posterior tooth having an occlusal surface with a peripheral ridge, a diamond-shaped ridge within the peripheral ridge and a longitudinal ridge bisecting the diamond ridge, said ridges having contours following the lobar pattern of a natural tooth.

4. An artificial posterior tooth having a plurality of depressions in the occlusal surface thereof defining a pair of divergent peripheral ridges extending from the mesial end of the tooth to the buccal and lingual sides of the tooth, said tooth also having convergent ridges on its occlusal surface extending from the lingual and buccal sides to the distal end of the tooth, and said ridges having contours following the lobar pattern of natural teeth.

5. A bicusipd artificial tooth having side walls following the contour of a natural tooth and an occlusal surface formed with a plurality of cavities defining divergent peripheral ridges extending from the mesial end of the tooth to the lingual and buccal walls thereof at a mid-point of the tooth together with convergent peripheral ridges extending from said mid-point to the distal end of the tooth, a diamond-shaped ridge within the confines of the peripheral ridges having the corners merging into the convergent ends of said peripheral ridges, and a central ridge along the facial-pharyngeal axis merging into the diamond ridge at the mesial and distal ends of the tooth, said central ridge having a convexly curved contour with the highest point thereof at said midportion of the tooth.

6. An artificial molar tooth having side walls conforming with the contour of a natural tooth and an occlusal surface provided with a plurality of depressions defining peripheral ridges diverging from the mesial end to the buccal and lingual sides of the tooth at the mid-point of the tooth and additional peripheral ridges converging from said mid-point to the distal end of the tooth, a diamond-shaped ridge having the corners thereof merging into the convergent ends of said peripheral ridges, and a central ridge bisecting said diamond ridge along the facial-pharyngeal axis of the tooth, said central ridge having a concave contour with the lowest point thereof at said midportion of the tooth.

7. A pair of artificial dentures having coacting upper and lower occlusal surfaces locking the dentures against prognathism but permitting free sidewise arcuate movement of the dentures, said occlusal surfaces having a plurality of mating knife-edged divergent shearing ridges adapted for prolonged sliding engagement in angular relation to readily cut food during the sidewise relative movement of the dentures.

8. A set of coacting upper and lower dentures having occlusal surfaces following the lobar pattern of natural teeth to lock the dentures against prognathism while permitting free sidewise arcuate movement of the dentures, said occlusal surfaces having isolated cavities therein bounded by knife-edged shearing ridges adapted for riding over each other during said sidewise movement to cut food at low masticating pressures.

9. A posterior tooth having six isolated cavities in the occlusal surface thereof bounded by divergent ridges, convergent ridges, and a central longitudinal ridge, said divergent ridges extending from the mesial end of the tooth to the buccal and lingual sides thereof, said convergent ridges extending from said sides to the distal end of the tooth, and said central ridge extending from the mesial to the distal end of the tooth.

10. A posterior tooth having an occlusal surface with a diamond-shaped ridge, said ridge having a contour following the lobar pattern of a natural tooth with the front and rear corners of the diamond at the mesial and distal ends of the tooth and with the side corners of the diamond at the buccal and lingual sides of the tooth intermediate said mesial and distal ends.

11. A set of artificial plates having cooperating upper and lower posterior teeth with occlusal surfaces having knife edged shearing ridges following the lobar pattern of natural teeth to interlock the bite between the teeth along the facial-pharyngeal axis while allowing normal lateral movement for chewing without effecting material separation of cooperating upper and lower teeth, and said occlusal ridges diverging from the facial-pharyngeal axis for prolonged sliding coaction along the ridges of cooperating teeth during said lateral chewing movement to shear food between the teeth at low masticating pressure.

12. A set of artificial plates including cooperating upper and lower posterior teeth each with occlusal surfaces having peripheral ridges, inner ridges, and a central ridge, all following the lobar pattern of natural teeth to interlock the bite between the teeth along the facial-pharyngeal axis while allowing normal lateral movement for chewing without effecting material separation of cooperating upper and lower teeth, said peripheral ridges diverging from the mesial end to the lingual and buccal sides and converging from said sides to the distal end of a tooth, said inner ridges diverging from the converging mesial ends of the peripheral ridges to the lingual and buccal ends thereof and converging from said lingual and buccal ends to the converging distal ends thereof, and said central ridge extending between the converging distal and mesial ends of the inner ridges.

13. A tooth having an occlusal surface with a peripheral ridge, an inner ridge, and a central ridge, said peripheral ridge diverging from the mesial and distal ends of the tooth to the buccal and lingual sides thereof, said inner ridge lying within the peripheral ridge and merging into the convergent ends of the peripheral ridge at the mesial, lingual, distal, and buccal ends thereof, and said central ridge lying within the inner ridge and extending between the mesial and distal ends thereof.

GEORGE STEELE.
ADOLPH E. SCHNEIDER.